United States Patent Office 3,243,456
Patented Mar. 29, 1966

3,243,456
PURIFICATION OF INSOLUBLE
DICARBOXYLIC ACIDS
John R. Caldwell and Clarence C. Dannelly, Kingsport,
Tenn., assignors to Eastman Kodak Company, Rochester, N.Y., a corporation of New Jersey
No Drawing. Filed June 6, 1962, Ser. No. 200,316
9 Claims. (Cl. 260—525)

This application is a continuation-in-part of John R. Caldwell et al. application U.S. Serial No. 826,126, filed July 10, 1959, now abandoned.

This invention concerns the purification of insoluble organic acids, more particularly high melting dicarboxylic acids which are difficult or impractical to purify by ordinary methods.

Many dicarboxylic acids of high molecular weight are difficult to purify due to their insolubility or very low solubility in organic solvents. Some of these dicarboxylic acids are manufactured by catalytic air oxidation and contain traces of multivalent metal ions and monocarboxylic acids. The customary methods of purification involve treatment with ion exchange resins and the like of solutions of the compound to be purified. However, since these materials are generally relatively insoluble, it is difficult to use these methods. Moreover, since some of these insoluble acids melt at such high temperatures, purification using distillation techniques merely results in the decomposition of the acid.

Our invention provides a simple method of purifying these insoluble organic acids which permits removal of multivalent metal ions and monocarboxylic acids. Moreover, by carefully adjusting the conditions, large pure crystals of the insoluble organic acid can be obtained.

One object of this invention is to provide a method of obtaining very pure polyfunctional organic acids that are insoluble or have very low solubility in ordinary solvents. Another object of the invention is to provide a method of purifying dicarboxylic acids which cannot be purified by recrystallization from ordinary solvents. A further object of the invention is to provide a method of purification that will separate dicarboxylic acids from traces of multivalent metal ions and Werner complexes of ions such as manganese, cobalt and iron. Another object of this invention is to provide a method of purifying insoluble dicarboxylic acids which will yield acids of sufficient purity to manufacture high molecular weight polymers such as polyamides and polyesters. A further object of the invention is to provide a method for precipitating very insoluble dicarboxylic acids in the form of relatively large, uniform crystals that are readily filtered and washed.

The objects of this invention are also accomplished by recrystallizing the insoluble acids using solutions of salts of weak acids as the recrystallization solvent.

We have found that our process is applicable to any organic acid which is less than 1% soluble in water at 25° C. and less than 2% at 100° C. and which melts above 100° C. It is especially applicable to dicarboxylic acids that contain monocarboxylic acids and other materials as impurities and are difficult to purify by ordinary methods such as distillation or recrystallization from ordinary solvents.

Acids which may be purified by the process of this invention include as typical acids such dibasic acids as terphthalic; 4,4′-sulfonyldibenzoic; 4,4′-ethylenedibenzoic; 4,4′-ethylenedioxydibenzoic; 4,4′-diphenic; transcyclohexane-1,4-dicarboxylic, and (bicyclohexyl)-4,4′-dicarboxylic acid. It will be appreciated that there are many other insoluble acids within the scope of the above description of acids which are operative in our invention.

The insoluble acids may be converted into any soluble salts such as ammonium, sodium, lithium, potassium and amine salts by adding bases or basic salts to a suspension of the acid. The suspended insoluble acid may constitute any part of the total weight of the suspension but the desirable range is 5–50% by weight. The amount of base that is added is the amount necessary to cause the insoluble acid to be converted into a soluble salt or enough to neutralize the dicarboxylic acid groups. The liquid may be water or mixtures of water and water-soluble organic liquids.

The solutions of the salts of insoluble organic acids may be treated with various absorbing agents such as activated carbons, clays, and ion exchange resins. These solutions may also be treated with oxidizing agents or reducing agents to convert various impurities to substances which can be removed more readily than the original form. The salts of the insoluble acid usually are recrystallized several times to obtain pure fractions.

After the insoluble acid salt has been purified by one or more of the above techniques, the insoluble acid is regenerated by treating the hot solution of the salt with a soluble acid which will cause the insoluble acid to form large, uniform, crystals of pure acid.

Numerous soluble acids may be used but these acids must have ionization constants which are lower than that of the insoluble acid which is being purified. These conditions are carefully adjusted and are specific for each acid that is being purified. The exact conditions vary and are dependent on the exact nature of the acid being purified. However, the temperature of the solution should be no lower than 20° C. below the boiling point of the solvent.

For instance, with an insoluble aromatic acid having an ionization constant approximately that of benzoic acid ($K=6.30\times10^{-5}$), a weaker acid such as acetic $$(K=1.75\times10^{-5})$$

is used. The exact values of the ionization constants are not critical, but the weaker acid should have an ionization constant value which is ½ to ¼ that of the insoluble acid. The regeneration of the insoluble acid by a weaker soluble acid depends on the extreme insolubility of the acid being purified.

Acids other than acetic acid can be used in the process of this invention. The choice of the particular useful acid is somewhat dependent on the acid being purified. Generally, any aliphatic carboxylic acid is suitable for the regeneration of insoluble aromatic acids. The ionization constants of these acids are similar to that of acetic acid ($K=1.75\times10^{-5}$). Examples of these acids are propionic acid ($K=1.34\times10^{-5}$); butyric acid ($K=1.506\times10^{-5}$); and adipic acid ($K=3.72\times10^{-5}$). Aliphatic insoluble acids require a weaker soluble acid such as dibasic sodium citrate ($K=4.0\times10^{-6}$), picolinic ($K=5\times10^{-6}$), monobasic sodium camphorate, or the like.

The concentration of the salt of the insoluble acid should be regulated to not more than 95% of saturation and therefore will depend on the solvent and the nature of the acid. In practice it is preferred to have these solutions 50–85% saturated.

The choice of solvents is dependent on the acid. Water mixed with an appropriate solvent can be used, provided the aqueous solution contains 40–60% of an organic solvent mixed with the water. The use of an alcohol-water mixture for instance is advantageous in removing impurities which are more soluble in organic-type solvent systems. Moreover, it is more advantageous to use a water-organic solvent system, since the insoluble acid is more soluble in such a system than in water and larger amounts can be purified using such a system. In addition, the size of the crystals obtained is much larger.

The organic solvents which may be used are those organic liquids which are miscible with water or are more than 20% soluble in water at 25° C. The lower alcohols are especially useful as represented by methyl, ethyl, n-propyl, isopropyl and tert-butyl. Other suitable water-miscible solvents include 1,4-dioxane, formamide, N-methylformamide, N,N-dimethylformamide, N-ethylformamide, N,N-diethylformamide and triethyl phosphate. The lower glycols containing up to about 5 carbon atoms are useful as represented by ethylene glycol, 1,2-propylene glycol, tetramethylene glycol and pentamethylene glycol.

The concentration of these salts may have a value from 1% to saturation, but the practical range is 10–40% by weight.

There are numerous salts of weak acids which can be used for this process but the monovalent salts of acetic acid and similar weak acids have the most general applicability. In a few instances it is advantageous to use divalent salts of acids such as calcium acetate or mixtures of monovalent and divalent salts. The salts which have been found useful for this process include ammonium acetate, lithium acetate, sodium acetate, potassium acetate, calcium acetate and the monoethanolamine salt of acetic acid.

In some cases the salts from formic acid and some of the higher molecular weight acids such as propionic and butyric are useful, but in most instances the salts of acetic acid are most practical. In all cases the salt must be made from an acid which has an ionization constant lower in value than that of the acid being purified.

The following examples are intended to illustrate our invention but not to limit it in any way.

EXAMPLE 1

One hundred grams of terephthalic acid was suspended in 1000 g. of water. The acid was yellow colored and was contaminated with 2.5% p-toluic acid and traces of cobalt salts. Eighty-five g. of 35% ammonium hydroxide solution and 2 g. charcoal were added. This mixture was heated at 100° C. for 30 minutes and the hot solution was filtered to remove the charcoal.

The solution was then cooled and the ammonium terephthalate crystallized. These crystals were filtered off and the mother liquor was saved for other purification batches. The ammonium terephthalate was dissolved in a minimum amount of hot water and an equal volume of isopropyl alcohol was added. The hot solution was stirred and an excess of acetic acid was added to regenerate the terephthalic acid.

Large, well-formed crystals of terephthalic acid formed slowly as the solution cooled. These crystals were separated by filtration and were washed three times with hot water. The final product was white and gave high polymers with glycols and diamines. Analysis of the purified acid showed no traces of cobalt ions.

EXAMPLE 2

Using the general process described in Example 1, 82 g. of terephthalic acid was purified by neutralizing a hot water suspension of the acid with ethanolamine. Excess acetic acid added to the hot solution caused a slow deposition of uniform, large readily filterable crystals of pure terephthalic acid.

EXAMPLE 3

Crude terephthalic acid which had been made by passing air into an acetic acid solution of p-xylene containing cobalt acetate as a catalyst was converted to the sodium salt. The sodium salt was recrystallized three times from water. The acid was then regenerated by adding hydrochloric acid to a solution of the sodium salt.

The regenerated acid was obtained as a very fine powder which was difficult to filter and would not make a high molecular weight polymer with ethylene glycol or 3,3'-oxybispropylamine. The reaction mixture was blue indicating the presence of cobalt.

EXAMPLE 4

Using the general process described in Example 1, 100 g. of (bicyclohexyl)-4,4'-dicarboxylic acid was purified by neutralizing a hot water suspension of the acid with ammonia. The ammonium salt was recrystallized from water and the acid was regenerated by adding excess acetic acid to a hot solution of the ammonium salt dissolved in 1 part ethanol, 1 part water. Large well-formed crystals precipitated as the soltuion cooled from 70° C. to room temperature.

EXAMPLE 5

Using the method described in Example 1, 100 g. of trans-cyclohexane-1,4-dicarboxylic acid was purified by neutralizing a hot water suspension of the acid with sodium hydroxide. The resulting solution was decolorized with 10 g. of carbon black and the sodium salt of the acid was recrystallized twice to obtain the pure salt. This salt was dissolved in a 1:1 mixture of methanol-water at 60° C. An excess of acetic acid was added to the hot solution and pure trans-cyclohexane-1,4-dicarboxylic acid was precipitated. This acid gave high polymers with various glycols.

EXAMPLE 6

The following table illustrates the results obtained by using water (Runs 1–4) and a water-isopropanol mixture (Run 5) as solvents in the purification of insoluble dicarboxylic acids. Varying amounts of acetic acid were used as indicated. In Runs 1–4 the terephthalic acid to be purified was dissolved in a mixture of 113 parts of ammonium hydroxide (30%) and 1160 parts of water. The solution was filtered and 0.4 part of an adsorbent was added to the filtrate. The resulting mixture was brought to a temperature of 70° C. and kept at this temperature for a period of 5 minutes, after which the adsorbent material was filtered off. A colorless filtrate was obtained from which terephthalic acid was precipitated. The terephthalic acid was filtered off, washed with water and dried. Run 5 was performed under the conditions of Example 1 above.

Table

| Run | Moles of Ammonium Terephthalate | Solvent | Moles of Acetic Acid | Grams of Precipitate | Theoretical Nitrogen, Percent | Nitrogen Found, Percent | Crystal Size, mm. |
|---|---|---|---|---|---|---|---|
| 1 | 1 | Water | 0.0 | 15 | 14.0 | 13.83 | |
| 2 | 1 | ----do---- | 0.5 | 38.1 | 0.0 | 7.74 | |
| 3 | 1 | ----do---- | 1.0 | 68.0 | 0.0 | 7.73 | |
| 4 | 1 | ----do---- | [1] 2.17 | 74.6 | 0.0 | 6.69 | 0.005 to 0.02 |
| 5 | 1 | 50% water, 50% isopropanol | [1] 2.17 | 148 | 0.0 | 0.05 | 0.1 to 1.0 |

[1] Small excess.

EXAMPLE 7

Ninety-four g. of 4,4'-ethylenedibenzoic acid was suspended in a mixture of 600 g. of water and 400 g. of 1,2-propylene glycol. The acid was discolored and contained a tarry material as impurity. Sixty g. of a 35% solution of ammonium hydroxide was added and the mixture was heated to 100° C. The acid went into solution, leaving the tarry residue. One g. of sodium hydrochlorite was added and the solution was boiled for 10 minutes. The solution was then filtered. While the solution was still hot, an excess of acetic acid was added and stirring was continued as the solution cooled. Large crystals of 4,4′-ethylenedibenzoic acid separated from solution. The crystals were collected on a filter and washed with water. The acid was white and gave high viscosity polyesters and polyamides.

EXAMPLE 8

Using the general procedure described in Example 1, the purification of 4,4′-methylenedibenzoic acid was carried out. A 40/60 mixture of dioxane/water was used as the solvent medium.

The invention has been described in detail with particular reference to preferred embodiments thereof, but it will be understood that variations and modifications can be effected within the spirit and scope of the invention as described hereinabove and as defined in the appended claims.

We claim:

1. A method for purifying an organic acid selected from the group consisting of aromatic dicarboxylic acids and alicyclic acids which are less than 1% soluble in water at 25° C., less than 2% soluble in water at 100° C., and which melt at above 100° C. whereby multivalent metal ions or monocarboxylic acids which may be present as impurities are removed from said organic acid which comprises
   (1) converting the acid to a water soluble salt,
   (2) dissolving the salt in a solvent mixture consisting of 60% to 40% water and 40% to 60% of an organic compound selected from the group consisting of alcohols having from 1–4 carbon atoms and containing no other reactive group than the hydroxyl group, 1,4-dioxane, formamide, N-methylformamide, N,N-dimethylformamide, N-ethylformamide, N,N-diethylformamide, triethyl phosphate, and glycols containing from 2 to 5 carbon atoms to provide a solution, and
   (3) regenerating the acid by adding to the solution maintained at a temperature no lower than 20° C. below the boiling point of the solvent mixture, an organic acid having an ionization constant $\frac{1}{2}$ to $\frac{1}{7}$ that of the acid to be purified.

2. The method of claim 1 wherein, prior to regenerating the acid, the solution is treated with activated carbon and the activated carbon removed.

3. The method of claim 1 wherein, prior to regenerating the acid, the acid salt is recrystallized at least once.

4. A method for purifying an organic acid selected from the group consisting of aromatic dicarboxylic acids and alicyclic dicarboxylic acids which are less than 1% soluble in water at 25° C., less than 2% soluble in water at 100° C., and which melt at above 100° C. whereby multivalent metal ions or monocarboxylic acids which may be present as impurities are removed from said organic acid which comprises
   (1) converting the acid to a soluble salt selected from the group consisting of ammonium, sodium, lithium, potassium, and amine salts,
   (2) dissolving the salt in a solvent mixture consisting of 60% to 40% water and 40% to 60% of an organic compound selected from the group consisting of alcohols having from 1–4 carbon atoms and containing no other reactive group than the hydroxyl group, 1,4-dioxane, formamide, N-methylformamide, N,N-dimethylformamide, N-ethylformamide, N,N-diethylformamide, triethyl phosphate, and glycols containing from 2 to 5 carbon atoms to provide a solution, and
   (3) regenerating the acid by adding to the solution maintained at a temperature no lower than 20° C. below the boiling point of the solvent mixture an organic acid having an ionization constant value which is $\frac{1}{2}$ to $\frac{1}{7}$ that of the acid to be purified.

5. A method of purifying terephthalic acid whereby multivalent metal ions or monocarboxylic acids which may be present as impurities are removed from said terephthalic acid which comprises
   (1) converting the acid to a soluble salt selected from the class consisting of ammonium, sodium, lithium, potassium, and amine salts,
   (2) dissolving the salt in a solvent mixture consisting of 60% to 40% water and 40% to 60% of an organic compound selected from the group consisting of alcohols having from 1–4 carbon atoms and containing no other reactive group than the hydroxyl group, 1,4 - dioxane, formamide, N - methylformamide, N,N-dimethylformamide, N-ethylformamide, N,N-diethylformamide, triethyl phosphate, and glycols containing from 2 to 5 carbon atoms to provide a solution, and
   (3) treating the solution with activated carbon,
   (4) removing the activated carbon from the solution, and
   (5) regenerating the acid by adding to the solution maintained at a temperature no lower than 20° C. below the boiling point of the solvent mixture an organic acid which has an ionization constant value which is $\frac{1}{2}$ to $\frac{1}{7}$ that of the acid to be purified.

6. The method of claim 5 wherein the acid employed in step (5) is acetic acid.

7. The method of claim 5 wherein the organic compound of which the solvent mixture is comprised is isopropyl alcohol.

8. The method of claim 5 wherein the organic compound of which the solvent mixture is comprised is methyl alcohol.

9. The method of claim 5 wherein the organic compound of which the solvent mixture is comprised is ethyl alcohol.

References Cited by the Examiner

UNITED STATES PATENTS

| | | | |
|---|---|---|---|
| 2,732,399 | 1/1956 | Carlston et al. | 260—525 |
| 2,811,548 | 10/1957 | Ham et al. | 260—525 |
| 2,829,160 | 4/1958 | Stehman et al. | 260—525 |
| 2,841,615 | 7/1958 | Schutt et al. | 260—525 |
| 2,938,050 | 5/1960 | Shirp et al. | 260—525 |
| 3,071,614 | 1/1963 | Knobloch | 260—525 |

FOREIGN PATENTS

| | | |
|---|---|---|
| 777,782 | 6/1957 | Great Britain. |
| 785,045 | 10/1957 | Great Britain. |
| 786,897 | 11/1957 | Great Britain. |
| 788,276 | 12/1957 | Great Britain. |
| 799,282 | 8/1958 | Great Britain. |

LORRAINE A. WEINBERGER, *Primary Examiner.*

LEON ZITVER, *Examiner.*

M. S. JAROSZ, S. B. WILLIAMS, *Assistant Examiners.*